(12) United States Patent
Chen (10) Patent No.: US 10,162,431 B2
(45) Date of Patent: Dec. 25, 2018

(54) INPUT DEVICE AND IDENTIFICATION SYSTEM INCLUDING THE SAME

(71) Applicant: SOUTHERN TAIWAN UNIVERSITY OF SCIENCE AND TECHNOLOGY, Tainan (TW)

(72) Inventor: Ruei-Tang Chen, Tainan (TW)

(73) Assignee: Southern Taiwan University of Science and Technology, Tainan (TW)

( * ) Notice: Subject to any disclaimer, the term of this patent is extended or adjusted under 35 U.S.C. 154(b) by 0 days.

(21) Appl. No.: 15/401,236

(22) Filed: Jan. 9, 2017

(65) Prior Publication Data
US 2017/0199583 A1 Jul. 13, 2017

(30) Foreign Application Priority Data
Jan. 11, 2016 (TW) .............................. 105100710 A (51) Int. Cl.
| G09G 5/00 | (2006.01) |
| G06F 3/03 | (2006.01) |
| G06F 21/32 | (2013.01) |
| G07C 9/00 | (2006.01) |

(52) U.S. Cl.
CPC ............ G06F 3/0325 (2013.01); G06F 21/32 (2013.01); *G07C 9/0069* (2013.01); *G07C 9/00158* (2013.01)

(58) Field of Classification Search
USPC .... 345/174, 8, 207, 519, 636, 156; 700/276; 324/761.01
See application file for complete search history.

(56) References Cited

U.S. PATENT DOCUMENTS

| 8,180,491 B2* | 5/2012 | Reid ................. G05D 23/1931 700/276 |
| 2011/0057901 A1* | 3/2011 | Raty ..................... G04G 21/04 345/174 |
| 2011/0205245 A1* | 8/2011 | Kennedy ................... F24J 2/40 345/636 |
| 2012/0043988 A1* | 2/2012 | Ramsey ................. H02J 13/00 324/761.01 |
| 2016/0098115 A1* | 4/2016 | Ren .................. H01L 31/02325 345/174 |
| 2016/0104451 A1* | 4/2016 | Sahin ..................... G09G 5/006 345/519 |
| 2016/0133222 A1* | 5/2016 | Paxson ................. G06F 3/0412 345/207 |
| 2016/0203663 A1* | 7/2016 | Proctor ............... G07C 9/00111 345/8 |

\* cited by examiner

*Primary Examiner* — Thuy Pardo
(74) *Attorney, Agent, or Firm* — Michael Best & Friedrich LLP (57) ABSTRACT

An identification system includes an input device and a verification device. A plurality of photovoltaic panels of the input device cooperatively receive light reflected off an object that is illuminated by a lighting module. Each photovoltaic panel converts light energy of the light received thereby into electricity. The input device further includes an electrical measurement unit to measure electrical quantities of the electricity generated by the photovoltaic panels, and an encoding unit to convert the electrical quantities into code parameters and to compose an input code using the code parameters. The verification device communicates with the input device, and verifies the input code.

19 Claims, 5 Drawing Sheets

INPUT DEVICE AND IDENTIFICATION SYSTEM INCLUDING THE SAME

CROSS-REFERENCE TO RELATED APPLICATION

This application claims priority of Taiwanese Patent Application No. 105100710, filed on Jan. 11, 2016.

FIELD

The disclosure relates to an identification system and an input device thereof.

BACKGROUND

It is common practice to install a lock on a door in order to prevent strangers from intruding into a private space, an office, etc. However, conventional locks, for example, a mechanical lock with a physical key and an electronic lock with an electronic key (e.g., a password, a keycard, etc.), have some disadvantages. For example, the conventional mechanical lock cannot be released if the unique physical key is lost, and the conventional electronic lock cannot be released if the unique keycard is lost or the password has been forgotten. There is another conventional electronic lock that can be released by biometric verification.

SUMMARY

Therefore, an object of the disclosure is to provide an input device that can alleviate at least one of the drawbacks of the prior art.

According to the disclosure, an input device includes a lighting module, a photovoltaic panel array and a processing module.

The lighting module is configured to emit light. The photovoltaic panel array includes photovoltaic panels configured to cooperatively receive light reflected off an object that is in front of the photovoltaic panels and that is illuminated by the light from the lighting module. Each of the photovoltaic panels is configured to convert light energy of the light received thereby into electricity.

The processing module includes an electrical measurement unit and an encoding unit. The electrical measurement unit is electrically connected to the photovoltaic panel array, and is configured to measure an electrical quantity of the electricity that is generated by each of the photovoltaic panels. The encoding unit is electrically connected to the electrical measurement unit, stores code parameters that correspond respectively to specific ranges of numerical values, and is configured to convert the electrical quantity into one of the code parameters that corresponds to one of the specific ranges of numerical values within which the electrical quantity falls, and to compose an input code using corresponding ones of the code parameters that are converted respectively from the electrical quantities.

Another object of the disclosure is to provide an identification system that is for identifying an object, and that can alleviate at least one of the drawbacks of the prior art.

According to the disclosure, the identification system includes an input device and a verification device.

The input device includes a lighting module, a photovoltaic panel array and a processing module.

The lighting module is configured to emit light. The photovoltaic panel array includes photovoltaic panels configured to cooperatively receive light reflected off an object that is in front of the photovoltaic panels and that is illuminated by the light from the lighting module. Each of the photovoltaic panels is configured to convert light energy of the light received thereby into electricity.

The processing module includes an electrical measurement unit and an encoding unit. The electrical measurement unit are electrically connected to the photovoltaic panel array, and configured to measure an electrical quantity of the electricity that is generated by each of the photovoltaic panels. The encoding unit is electrically connected to the electrical measurement unit, stores code parameters that correspond respectively to specific ranges of numerical values, and configured to convert the electrical quantity into one of the code parameters that corresponds to one of the specific ranges of numerical values within which the electrical quantity falls, and to compose an input code using corresponding ones of the code parameters that are converted respectively from the electrical quantities.

The verification device is configured to communicate with the input device, to receive the input code therefrom, and to verify the input code.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
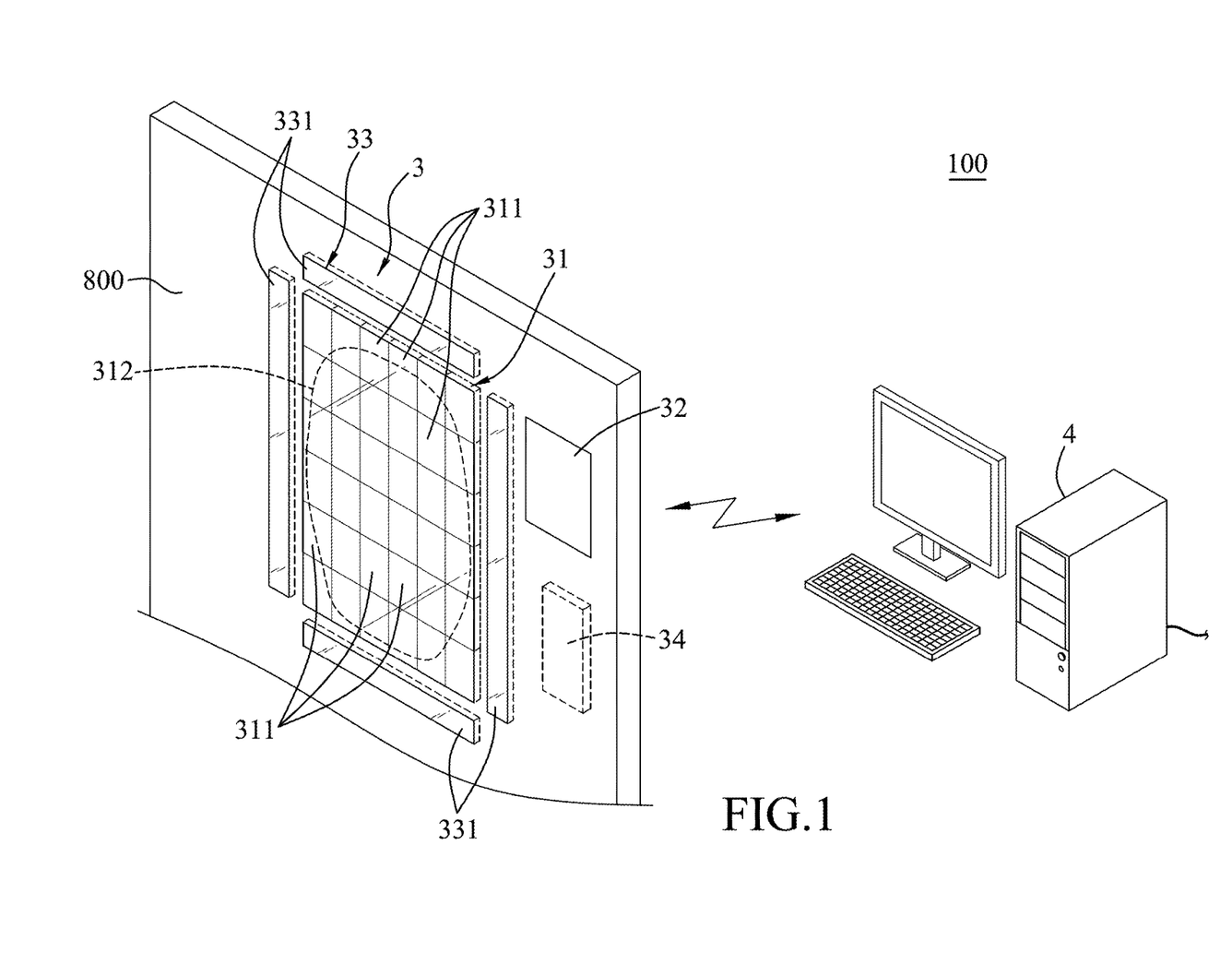
FIG. 1 is a perspective schematic view of an embodiment of an identification system for identifying an object according to this disclosure.
Figure 2:
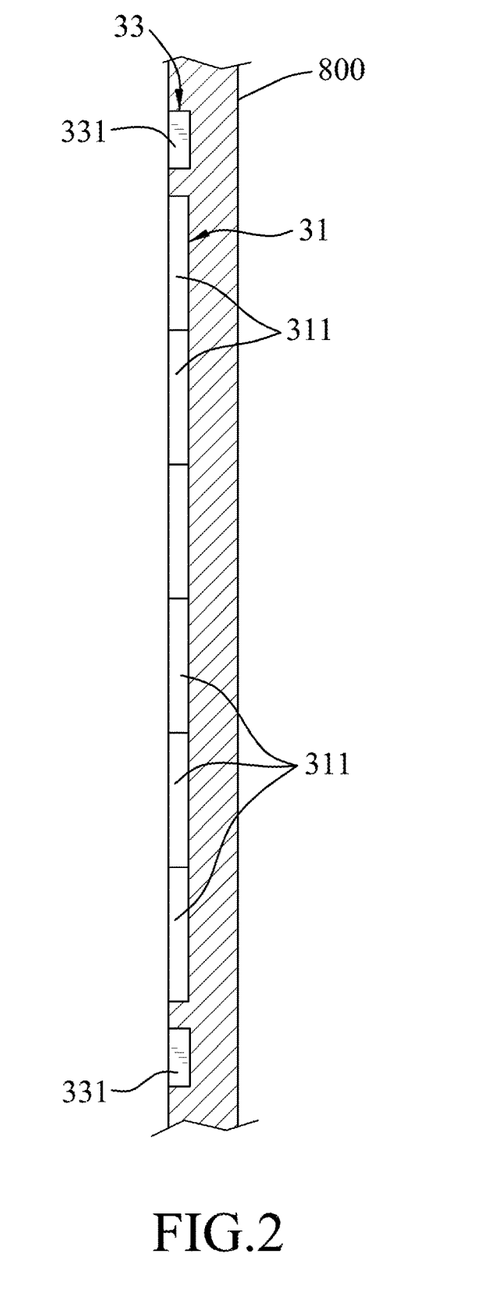
FIG. 2 is a fragmentary sectional schematic view of an input device included in the identification system.
Figure 3:
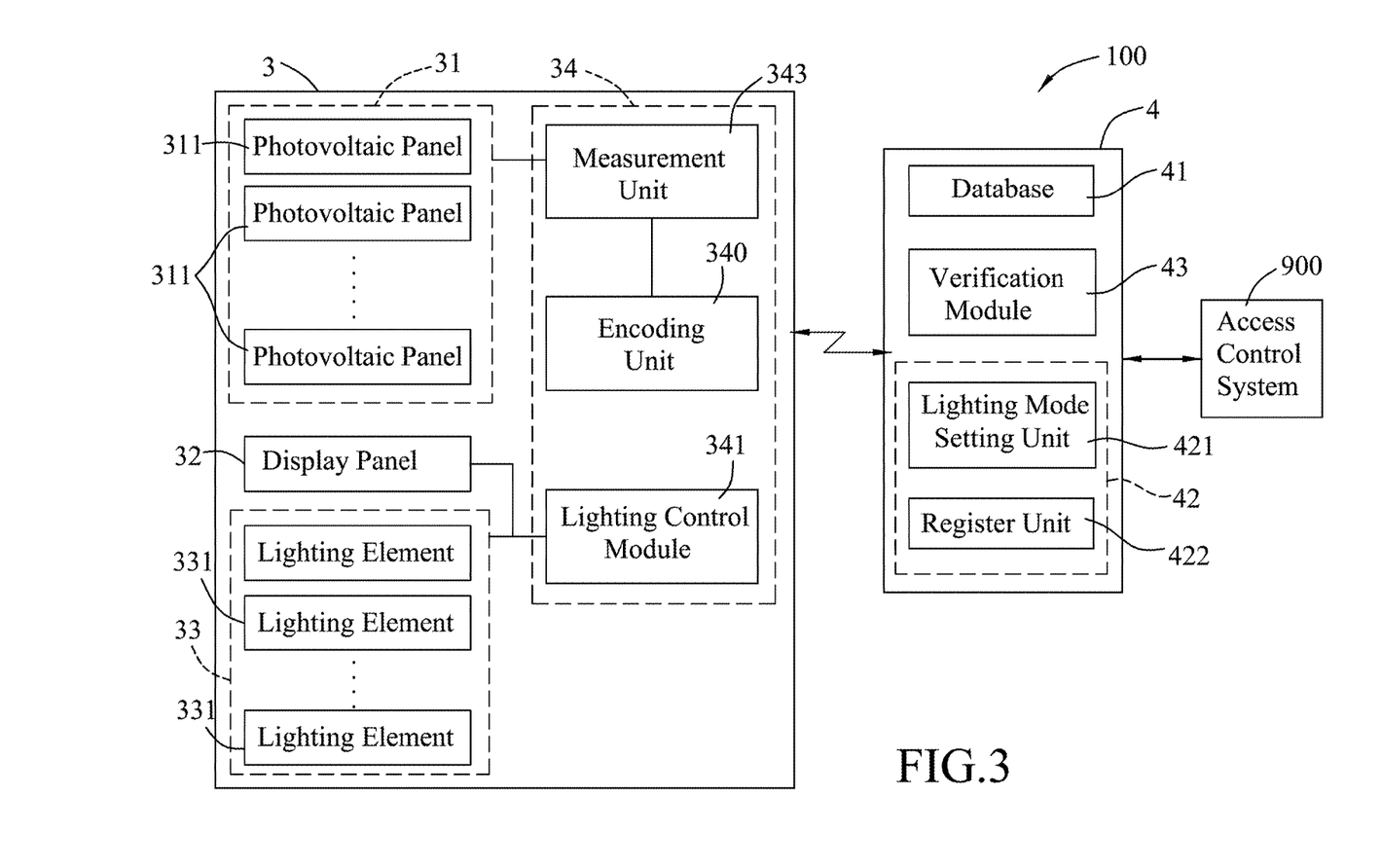
FIG. 3 is a block diagram of the identification system.

Referring to FIGS. 1 to 3, an embodiment of an identification system 100 is used to identify an object, such as a body part of a user (e.g., a hand, a face, etc.) or a unique article serving as a key. The identification system 100 includes an input device 3 embedded into a wall 800, and a verification device 4 communicably coupled to the input device 3 and an access control system 900. For example, the access control system 900 is an electronic lock preventing an unauthorized user from entering, for example, a private space or an office, or a storage device preventing an unauthorized user from accessing data stored therein, or a network node device preventing an unauthorized user from using network resources provided thereby. In practice, the input device 3 and the verification device 4 may be coupled to each other by using wired or wireless communication, such as Bluetooth®, ZigBee®, WiFi, the third generation of wireless mobile telecommunications technology (3G), the fourth generation of wireless mobile telecommunications technology (4G), and so on. In another embodiment, the verification device 4 can be configured as a cloud device, and the input device 3 is configured to communicate with the verification device 4 via the Internet.

The input device 3 includes a photovoltaic panel array 31, a display panel 32, a lighting module 33, and a processing module 34 that is electrically connected to the photovoltaic panel array 31, the display panel 32 and the lighting module 33.

The lighting module 33 is embedded in the wall 800, and is configured to emit light in a forward direction which the photovoltaic panel array 31 faces. The lighting module 33 includes a plurality of lighting elements 331 placed around the photovoltaic panel array 31. In this embodiment, the lighting module 33 includes four lighting elements 331 that are placed along the four sides of the photovoltaic panel array 31 as shown in FIG. 1.

Figure 4:
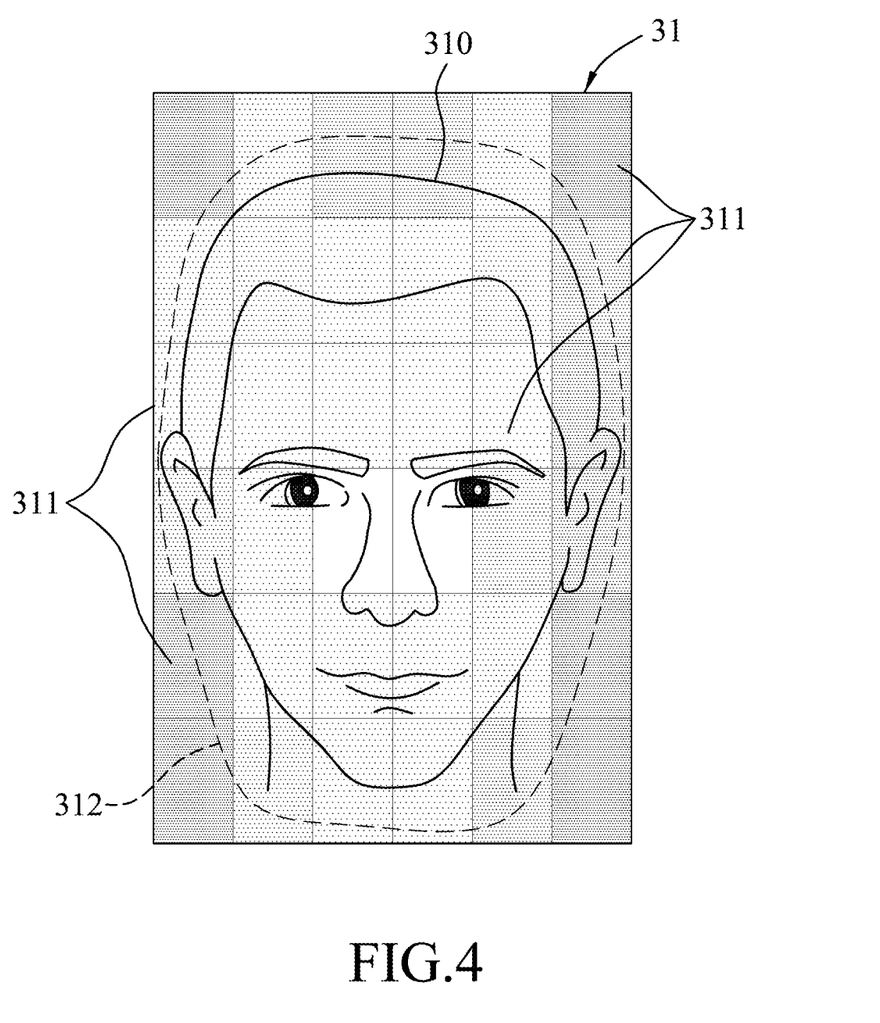
FIG. 4 is a front schematic view of a photovoltaic panel array having shown thereon an image of the object that is illuminated by a lighting module with a pre-set lighting mode.

Further referring to FIG. 4, the photovoltaic panel array 31 includes a plurality of photovoltaic panels 311 that are arranged, for example, as a rectangular array in this embodiment. The photovoltaic panels 311 face the forward direction, and are configured to cooperatively receive light reflected off the object (not shown) that is illuminated by the light from the lighting module 33. The reflection of the object forms an image 310 on the photovoltaic array 31. The object is a face of a user in this embodiment. When placed in front of the photovoltaic panels 311, the object is illuminated by the light from the lighting module 33. Each of the photovoltaic panels 311 is configured to convert light energy of the light received thereby (due to reflection of a portion of the object corresponding to a part of the image 310 on the photovoltaic panel 311) into electricity. In this embodiment, the photovoltaic panel array 31 has a positioning region 312 that is defined by a broken line marked on a front surface of the photovoltaic panel array 31 and that has a shape similar to a profile of a human face. In other embodiments, the identification system 100 may be configured to identify a hand of the user, and accordingly the positioning region 312 may have a shape similar to an outline of a human hand. In use, the user needs to adjust a position of the object to have the image 310 of the object be formed in the positioning region 312.

Since the lighting elements 331 are disposed at different positions, the lighting elements 331 can illuminate the object independently from different directions, respectively. Therefore, each of the lighting elements 331 can independently contribute to a brightness distribution that is different from any one of the other lighting elements 331.

The display panel 32 is a touchscreen, and is embedded in the wall 800 near the photovoltaic panel array 31 in this embodiment. In one embodiment, the display panel 32 is a transparent touchscreen, and is integrated with the photovoltaic panel array 31.

The processing module 34 includes a lighting control unit 341, an electrical measurement unit 343 and an encoding unit 344.

The lighting control unit 341 is electrically connected to the lighting module 33 and to the display panel 32, stores different pre-set lighting modes. Each of the pre-set lighting modes includes a first parameter and a second parameter. The first parameter indicates a number of times for activating the lighting module 33 to emit light. The second parameter indicates which one(s) of the lighting elements 311 is (are) turned on each time the lighting module 33 is activated. For example, for one of the pre-set lighting modes, the first parameter indicates that the lighting module 33 is activated two times, and the second parameter indicates that the lighting element 331 near the left side of the photovoltaic panel array 31 emits light alone the first time the lighting module 33 is activated and all of the lighting elements 311 emit light together the second time the lighting module 33 is activated. It should be noted that the pre-set lighting modes are not limited to the example described above.

The lighting control unit 341 is configured to control the display panel 32 to display a user interface (not shown in Figures) illustrating all of the pre-set lighting modes for allowing the user to select one of the pre-set lighting modes. Each of the pre-set lighting modes can be illustrated as a user-distinguishable text label, icon, image, or the like. The lighting control unit 341 is also configured to activate the lighting module 33 in response to a user selection of one of the pre-set lighting modes (hereinafter referred to as the selected one of the pre-set lighting modes), and to control the lighting module 33 to emit light according to the selected one of the pre-set lighting modes. In particular, the lighting control unit 341 activates the lighting module 33 a particular number of times as indicated by the first parameter of the selected one of the pre-set lighting modes, and turns on corresponding particular one(s) of the lighting elements 331 each time the lighting module 33 is activated according to the second parameter of the selected one of the pre-set lighting modes.

The electrical measurement unit 343 is electrically connected to the photovoltaic panel array 31, and configured to measure an electrical quantity of the electricity that is generated by each of the photovoltaic panels 311 each time the lighting module 33 is activated. In some embodiments, the electrical measurement unit 343 is activated simultaneously with the lighting module 33 to measure the electrical quantity of the electricity. In some embodiments, the lighting control unit 341 may be configured to activate the lighting module 33 and the electrical measurement unit 343 simultaneously. In some embodiments, the input device 3 may further include a sensor (not shown) to detect presence of the object, and the lighting control unit 341 is configured to activate the lighting module 33 when the sensor detects the object. In some embodiments, the user can operate the user interface displayed on the display panel 32 for activating the lighting module 33 when the user places the object in front of the photovoltaic panel array 31.

Figure 5:
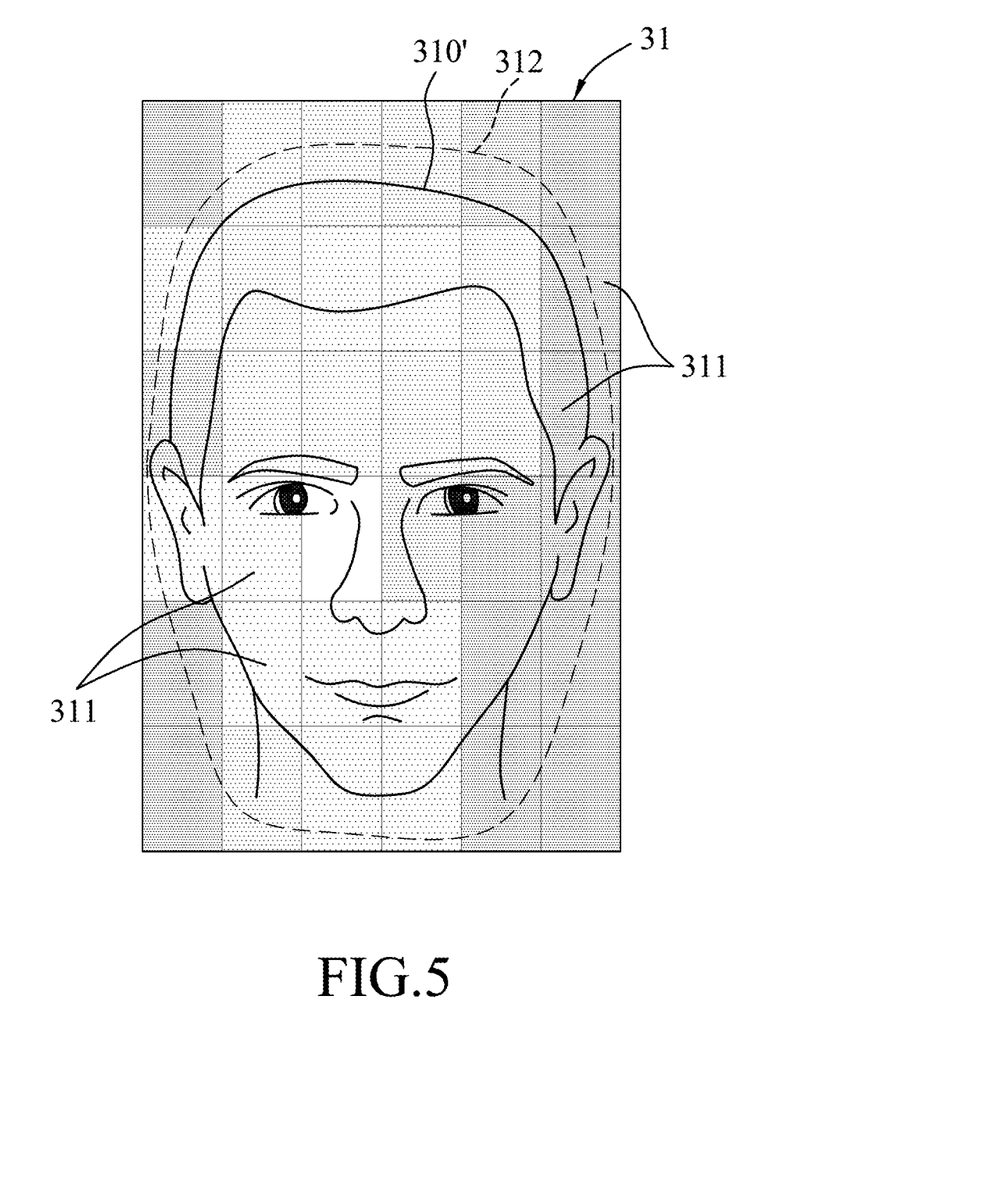
FIG. 5 is another front view of the photovoltaic panel array having shown thereon another image of the object that is illuminated by the lighting module with another pre-set lighting mode.

For the ease of understanding, the electrical quantities of the electricity that are generated respectively by the photovoltaic panels 311 are illustrated by different grayscales in FIGS. 4 and 5. FIG. 4 illustrates the image 310 of the object reflected on the photovoltaic panel array 31 under illumination by the lighting module 33 (see FIG. 1) in one of the pre-set lighting modes, and FIG. 5 illustrates another image 310' of the object reflected on the photovoltaic panel array 31 under illumination by the lighting module 33 in another pre-set lighting mode. For example, the lighter grayscale of the photovoltaic panel 311 indicates the greater electrical quantity of the electricity generated by the photovoltaic panel 311.

The encoding unit 344 is electrically connected to the electrical measurement unit 343, and stores code parameters that correspond respectively to specific ranges of numerical values. The encoding unit 344 is configured to convert the electrical quantity into one of the code parameters that corresponds to one of the specific ranges of numerical values within which the electrical quantity falls, to compose an input code using corresponding ones of the code parameters that are converted respectively from the electrical quantities, and to transmit identification information that includes the input code and the selected one of the pre-set lighting modes to the verification device 4. In a case that the lighting module 33 is activated multiple times, the encoding unit 344 composes a parameter set by combining the corresponding ones of the code parameters each time the lighting module 33 is activated, and composes the input code by combining the parameter sets. In a case that the lighting module 33 is activated only one time, the encoding unit 344 composes the input code by directly combining the corresponding ones of the code parameters.

Referring to FIGS. 1 and 3, the verification device 4 includes a database 41, a register module 42 and a verification module 43. The verification device 4 is configured to communicate with the input device 3 for receiving the identification information therefrom, to verify the input code, and to register a new code.

The database 41 stores a plurality of registered codes that are associated with the pre-set lighting modes, respectively.

The register module 42 is configured to register a new code, and includes a lighting mode setting unit 421 and a register unit 422. The lighting mode setting unit 421 is configured to control the display panel 32 to display a setting interface (not shown in Figures) for allowing the user to add a new lighting mode by setting the first parameter and the second parameter for the new lighting mode. After the new lighting mode is established, the register unit 422 is configured to send and store the new lighting mode in the lighting control unit 341 as an additional pre-set lighting mode (in other words, the number of pre-set lighting modes stored in the lighting control unit 341 is increased by one), to control the lighting control unit 341 to drive the lighting module 33 according to the new lighting mode such that the processing module 34 composes a new code in the above manner, to receive the new code from the encoding unit 344, to associate the new code with the new lighting mode, and to store the new code in the database 41 as an additional registered code (in other words, the number of registered codes stored in the database 41 is increased by one). In some embodiments, the new code can be further associated with additional properties including, but not limited to, access authority, a permission duration and limitation of network traffic.

The verification module 43 is configured to receive the identification information from the input device 3, to determine, based on the input code and the selected one of the pre-set lighting modes included in the identification information, whether the input code matches (e.g., being identical with) one of the registered codes that is associated with the selected one of the pre-set lighting modes, and to output a verification signal indicating that the object has been verified when it is determined that the input code matches one of the registered codes that is associated with the selected one of the pre-set lighting modes.

Referring to FIGS. 1, 3 and 4, when the identification system 100 according to an embodiment of this disclosure is operated to register a new code for the user, the user can operate the setting interface on the display panel 32 to establish a new lighting mode by setting the first parameter and the second parameter. Then, the user needs to position the object (e.g., the user's face) in front of the photovoltaic panel array 31. After that, the register module 42 controls the lighting control unit 341 to drive the lighting module 33 to emit light according to the new lighting mode, and the electrical measurement unit 343 measures the electrical quantities of the electricity that are generated by the photovoltaic panels 311 each time the lighting module 33 is activated. Then, the encoding unit 344 converts the electrical quantities into code parameters, and composes a new code using these code parameters. The new code is then stored in the database 41 as a new registered code, and is associated with the new lighting mode.

When the identification system 100 according to one embodiment of this disclosure is operated to identify the user, the user needs to operate the user interface on the display panel 32 and to select one of the pre-set lighting modes shown in the user interface. Once the user selects one of the pre-set lighting modes and places the object in front of the photovoltaic panel array 31, the lighting control unit 341 controls the lighting module 33 to emit light according to the selected one of the pre-set lighting modes. The electrical measurement unit 343 measures the electrical quantities of the electricity that are generated by the photovoltaic panels 311 each time the lighting module 33 is activated. Then, the encoding unit 344 converts the electrical quantities into the corresponding ones of the code parameters, and composes the input code using the corresponding ones of the code parameters. When the identification information including the input code and the selected one of the pre-set lighting modes is sent to the verification module 43, the verification module 43 determines whether the input code is matches (e.g., is identical to) one of the registered codes that is associated with the selected one of the pre-set lighting modes, and the verification module 43 outputs the verification signal to the access control system 900 when a match is found. In response to receipt of the verification signal indicating that the object has been verified, the access control system 900 allows the user, for example, to enter the private space or the office, to access the data stored therein, or to use the network resource provided thereby.

In sum, the input device 3 of the identification system 100 according to this disclosure can illuminate the object, and form the image 310, 310' of the object with specific brightness distribution through reflection. Since the object (e.g., the face of the user) has a unique three-dimensional contour, the specific brightness distribution of the image 310, 310' of the object will be unique. Accordingly, a combination of the electrical quantities generated respectively by the photovoltaic panels 311 is unique, and thus, the input code converted from the electrical quantities is also unique and can be used to verify the identity of the user. Further, the photovoltaic panel array 31 can also convert solar energy into electricity that can be used by the identification system 900.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An input device comprising:
   a lighting module configured to emit light;
   a photovoltaic panel array including a plurality of photovoltaic panels configured to cooperatively receive light reflected off an object that is in front of said photovoltaic panels and that is illuminated by the light from said lighting module, each of said photovoltaic panels being configured to convert light energy of the light received thereby into electricity; and a processing module including an electrical measurement unit electrically connected to said photovoltaic panel array, and configured to measure an electrical quantity of the electricity that is generated by each of said photovoltaic panels of said photovoltaic panel array, and an encoding unit electrically connected to said electrical measurement unit, storing a plurality of code parameters that correspond respectively to specific ranges of numerical values, and configured to convert the electrical quantity into one of the code parameters that corresponds to one of the specific ranges of numerical values within which the electrical quantity falls, and to compose an input code using corresponding ones of the code parameters that are converted respectively from the electrical quantities.

2. The input device of claim 1, wherein said electrical measurement unit is activated to measure the electrical quantity of the electricity when said lighting module emits light.

3. The input device of claim 1, wherein said lighting module includes a plurality of lighting elements placed around said photovoltaic panel array, and said processing module is configured to control said lighting module to emit light.

4. The input device of claim 3, wherein said processing module further includes a lighting control unit that is electrically connected to said lighting module, that stores a plurality of different pre-set lighting modes each including a first parameter indicating a number of times for activating said lighting module to emit light and a second parameter indicating which one(s) of said lighting elements is(are) turned on each time said lighting module is activated, and that is configured to drive said lighting module according to one of the pre-set lighting modes.

5. The input device of claim 4, wherein said electrical measurement unit is configured to measure the electrical quantity of the electricity generated by each of said photovoltaic panels each time said lighting module is activated, wherein said encoding unit is further configured to compose a parameter set by combining the corresponding ones of the code parameters that are converted respectively from the electrical quantities each time said lighting module is activated, and to compose the input code by combining the parameter sets.

6. The input device of claim 4, further comprising a display panel electrically connected to said lighting control unit and configured to display all of the pre-set lighting modes for allowing a user to select one of the pre-set lighting modes, wherein said lighting control unit is configured to activate said lighting module in response to a user selection of a selected one of the pre-set lighting modes, and to control said lighting module to emit light according to the selected one of the pre-set lighting modes.

7. The input device of claim 1, wherein said encoding unit is configured to compose the input code by combining the corresponding ones of the code parameters that are converted respectively from the electrical quantities.

8. The input device of claim 1, wherein said lighting module is configured to emit light in a forward direction which said photovoltaic panels face.

9. An identification system for identifying an object, said identification system comprising:

an input device including a lighting module configured to emit light;

a photovoltaic panel array including a plurality of photovoltaic panels configured to cooperatively receive light reflected off an object that is in front of said photovoltaic panels and that is illuminated by the light from said lighting module, each of said photovoltaic panels being configured to convert light energy of the light received thereby into electricity, and a processing module including an electrical measurement unit electrically connected to said photovoltaic panel array, and configured to measure an electrical quantity of the electricity that is generated by each of said photovoltaic panels of said photovoltaic panel array, and an encoding unit electrically connected to said electrical measurement unit, storing a plurality of code parameters that correspond respectively to specific ranges of numerical values, and configured to convert the electrical quantity into one of the code parameters that corresponds to one of the specific ranges of numerical values within which the electrical quantity falls, and to compose an input code using corresponding ones of the code parameters that are converted respectively from the electrical quantities; and a verification device configured to communicate with said input device, to receive the input code therefrom, and to verify the input code.

10. The identification system of claim 9, wherein said electrical measurement unit is activated to measure the electrical quantity of the electricity when said lighting module emits light.

11. The identification system of claim 9, wherein said lighting module includes a plurality of lighting elements placed around said photovoltaic panel array, and said processing module is configured to control said lighting module to emit light.

12. The identification system of claim 11, wherein said processing module further includes a lighting control unit that is electrically connected to said lighting module, that stores a plurality of different pre-set lighting modes each including a first parameter indicating a number of times for activating said lighting module to emit light and a second parameter indicating which one(s) of said lighting elements is(are) turned on each time said lighting module is activated, and that is configured to drive said lighting module according to one of the pre-set lighting modes.

13. The identification system of claim 12, wherein said electrical measurement unit is configured to measure the electrical quantity of the electricity generated by each of said photovoltaic panels each time said lighting module is activated, wherein said encoding unit is further configured to compose a parameter set by combining the corresponding ones of the code parameters that are converted respectively from the electrical quantities each time said lighting module is activated, and to compose the input code by combining the parameter sets.

14. The identification system of claim 12, further comprising a display panel electrically connected to said lighting control unit and configured to display all of the pre-set lighting modes for allowing a user to select one of the pre-set lighting modes, wherein said lighting control unit is configured to activate said lighting module in response to a user selection of a selected one of the pre-set lighting modes, and to control said lighting module to emit light according to the selected one of the pre-set lighting modes.

15. The identification system of claim 14, wherein said verification device includes:
a database storing a plurality of registered codes that are associated with the pre-set lighting modes, respectively; and
a verification module configured to determine whether the input code matches one of the registered codes that is associated with the selected one of the pre-set lighting modes, and to output a verification signal indicating that the object has been verified when it is determined that the input code matches the one of the registered codes associated with the selected one of the pre-set lighting modes.

16. The identification system of claim 15, wherein said verification device further includes a register module including:
a lighting mode setting unit configured to control said display panel to display a setting interface for allowing the user to add a new lighting mode by setting the first parameter and the second parameter for the new lighting modes; and
a register unit configured to send and store the new lighting mode to said lighting control unit as an additional pre-set lighting mode, to control said lighting control unit to drive said lighting module according to the new lighting mode such that said processing module composes a new code, to receive the new code from said encoding unit, to associate the new code with the new lighting mode, and to store the new code to said database as an additional registered code.

17. The identification system of claim 9, wherein said verification device includes:
a database storing a plurality of registered codes; and
a verification module configured to determine whether the input code matches one of the registered codes that is associated with the selected one of the pre-set lighting modes, and to output a verification signal indicating the object has been verified when the input code matches the one of the registered codes associated with the selected one of the pre-set lighting modes.

18. The identification system of claim 9, wherein said encoding unit is configured to compose the input code by combining the corresponding ones of the parameters that are converted respectively from the electrical quantities.

19. The identification system of claim 9, wherein said lighting module is configured to emit light in a forward direction which said photovoltaic panels face.

* * * * *